UNITED STATES PATENT OFFICE.

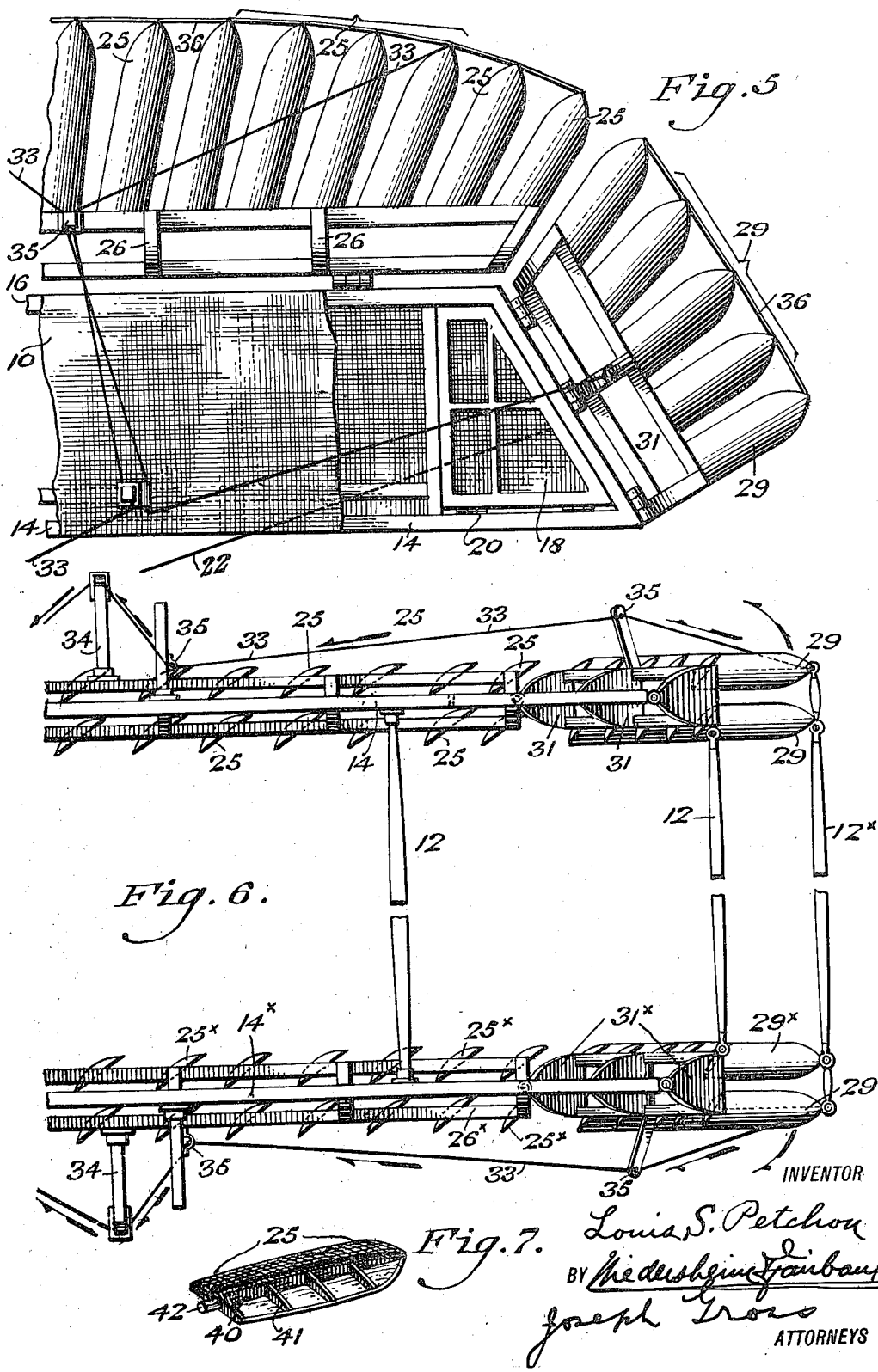

LOUIS S. PETCHON, OF PHILADELPHIA, PENNSYLVANIA.

AEROPLANE.

1,311,576.
Specification of Letters Patent.
Patented July 29, 1919.

Application filed December 4, 1918. Serial No. 265,291.

*To all whom it may concern:*

Be it known that I, LOUIS S. PETCHON, a subject of the Government of Russia, and a resident of the city of Philadelphia, county of Philadelphia, State of Pennsylvania, have invented a new and useful Aeroplane, of which the following is a specification.

My invention relates to heavier than air flying machines, and it is of peculiar applicability to biplanes, although it is available with, and similarly applicable to, monoplanes and multiplanes.

Broadly expressed, the object of my invention is to provide a controllable apparatus to insure the safety of the machine by at all times maintaining its equilibrium or lateral balance, and sustaining its weight by the natural propulsive force of the air which passes through the machine in flight and in itself constitutes a propelling force in disregard of the mechanical motive power of the machine.

My further object is to maintain what I call the "natural stability" of the machine, to the end that by the controlling of the vital members which, for want of a better term, I have designated the "feather apparatus" and also the dual assemblage of pluralities of feathers, and by the skilfully controlled lifting and dropping, or tilting or angling, of said members, the machine may, so to speak, be rendered stationary in the air, the constant propulsive force of the air through the feather apparatus maintaining the equilibrium of the machine during the stoppage of its flight.

The theory upon which my invention is based is the result of some years of study and experiment of the flight of birds, in an effort to solve the problem of the flying machine by the application of the principles of bird flight.

It is known that the wing of a bird consists essentially of a small surface to the rearward or outer end of which feathers or split or divided surfaces are attached, and that in order for the bird to rise upon its wings, they are flapped upward and downward, on the upward stroke the feathers opening or separating and on the downward stroke closing or coming together.

With the separation of the feathers, therefore, permitting the bird to utilize the propelling force of the air through the feathers, the air falls, so to speak, from the side margin of one feather directly upon another, and its constant force through the divided surfaces of the feathers occasions a semi-circular sweep on each side of a wing, with a resultant tendency at all times to maintain equilibrium.

By the application of these principles of the flight of a bird, to a flying machine, I secure in it results of flight similar to the results secured by birds in flying.

For the purpose of illustrating my invention, I have shown in the accompanying drawings, a certain type and embodiment of it as applied to a biplane.

It is to be understood, however, that the various elements or instrumentalities in which my invention is shown as embodied can be variously modified to adapt it to monoplanes or to multiplanes, and also to biplanes of somewhat different organization from that illustrated, and that my invention is not, therefore, limited to the precise arrangement and organization of the illustrations of the drawings which are hereinafter more particularly described.

Thus, I have illustrated a simple and well known type of biplane, and I desire it to be understood that the old and well known elements of this biplane, such as the fuselage as an organic whole, the wings or technical "surfaces" the tail planes, the vertical rudder, the motor, the propeller, the under-carriage skid, the tail skid, the motor control lever, the cable-control lever or "joy-stick," the steering wheel, the guys or wing-operating cables, the struts, the spars, and the mounting and connecting devices, which in various assemblages exist in all biplanes of modern and approved type—are utilized by me and typically illustrated because in the application of my feather apparatus to the machine proper, I desire to take advantage of all of the most recent improvements in the construction of flying machines.

Thus, without further reference to it, I prefer to use any desired top, side cross, and control, wire-bracing and locking, and also the preferred modern construction of the main wings and of the tail wings, in which the leading edges and the trailing edges, the main spar, the rear spar, the holed-out ribs and the especially "doped" fabric surface, are of each and all of a type and character calculated to assure the best results in the matter of light yet strong construction and general durability.

Inasmuch as my invention especially comprehends what I have termed my feather apparatus which is applied to both the main wings and the tail wings, and also comprehends horizontal rudders applied to said main wings and tail wings, together with operating means or cable-controls for said feather apparatus and said horizontal rudders,—I have confined my illustrations, and will confine my description of the machine as an entirety, with particular reference to the features which are new with me, and which in their assemblage, collocation, combination, and arrangement with relation to the old or elemental parts of a flying machine as such, constitute my invention,—it being understood that the operating and controlling devices or means by which the pilot, under varying conditions of wind pressure and direction, operates the feather apparatus and horizontal rudders, may be of different kinds and not necessarily of any one particular type.

Referring to the drawings:—

Fig. 5 represents a plan view of a fragmentary portion of the right-hand upper main wing of the machine, illustrating the application of my feather apparatus and also one of my horizontal rudders.

Fig. 6 represents a fragmentary front elevation of that portion of the right-hand main wing which is illustrated in plan in Fig. 5, and Fig. 7 represents a perspective of one of my feathers removed from its frame and constructed, in a general sense, in imitation of the best method of wing construction.

Similar numerals of reference indicate corresponding parts.

Referring to the drawings:—

Figure 1:
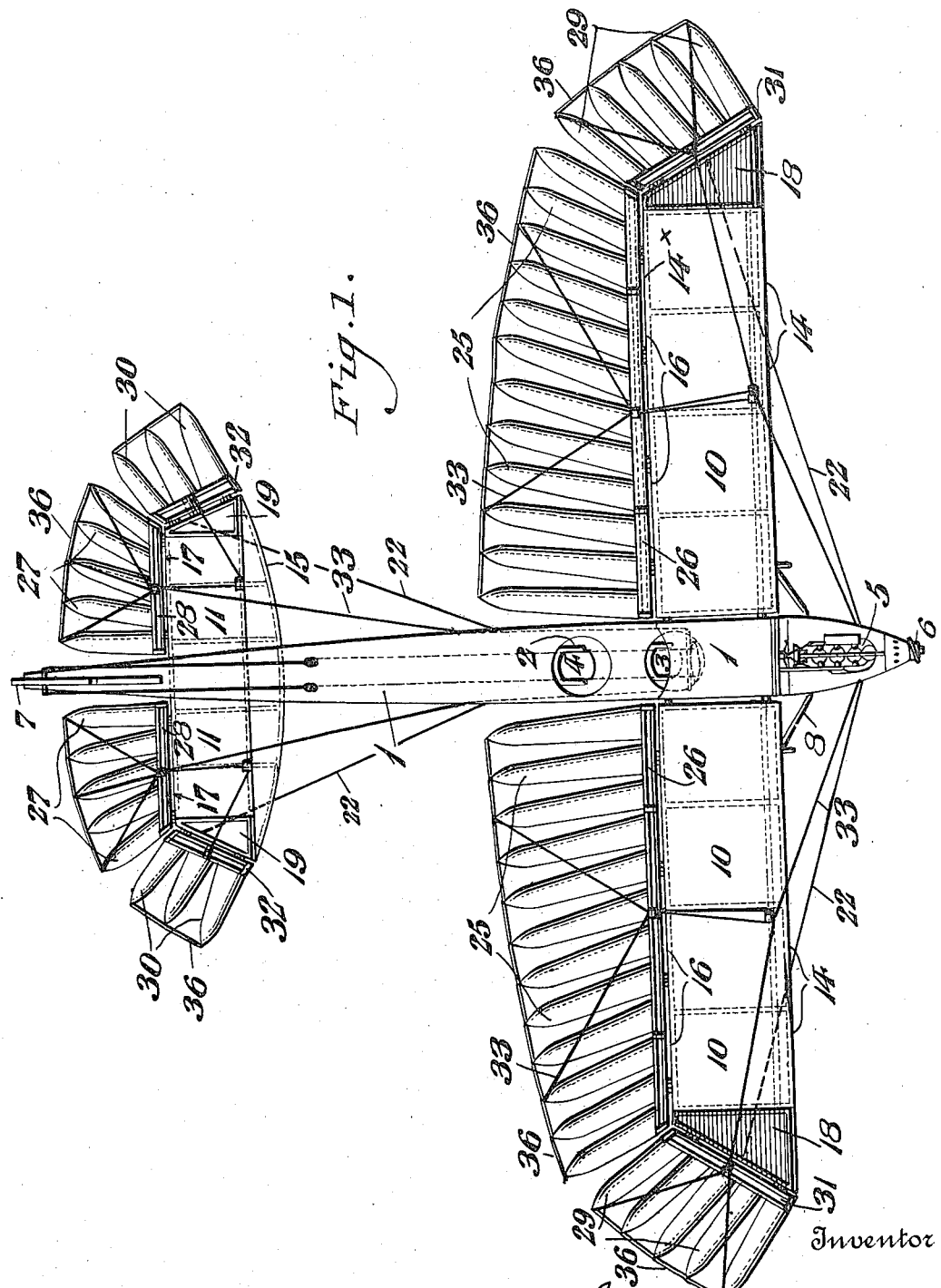
Figure 1 represents a plan view of an aeroplane embodying my invention.
Figure 2:
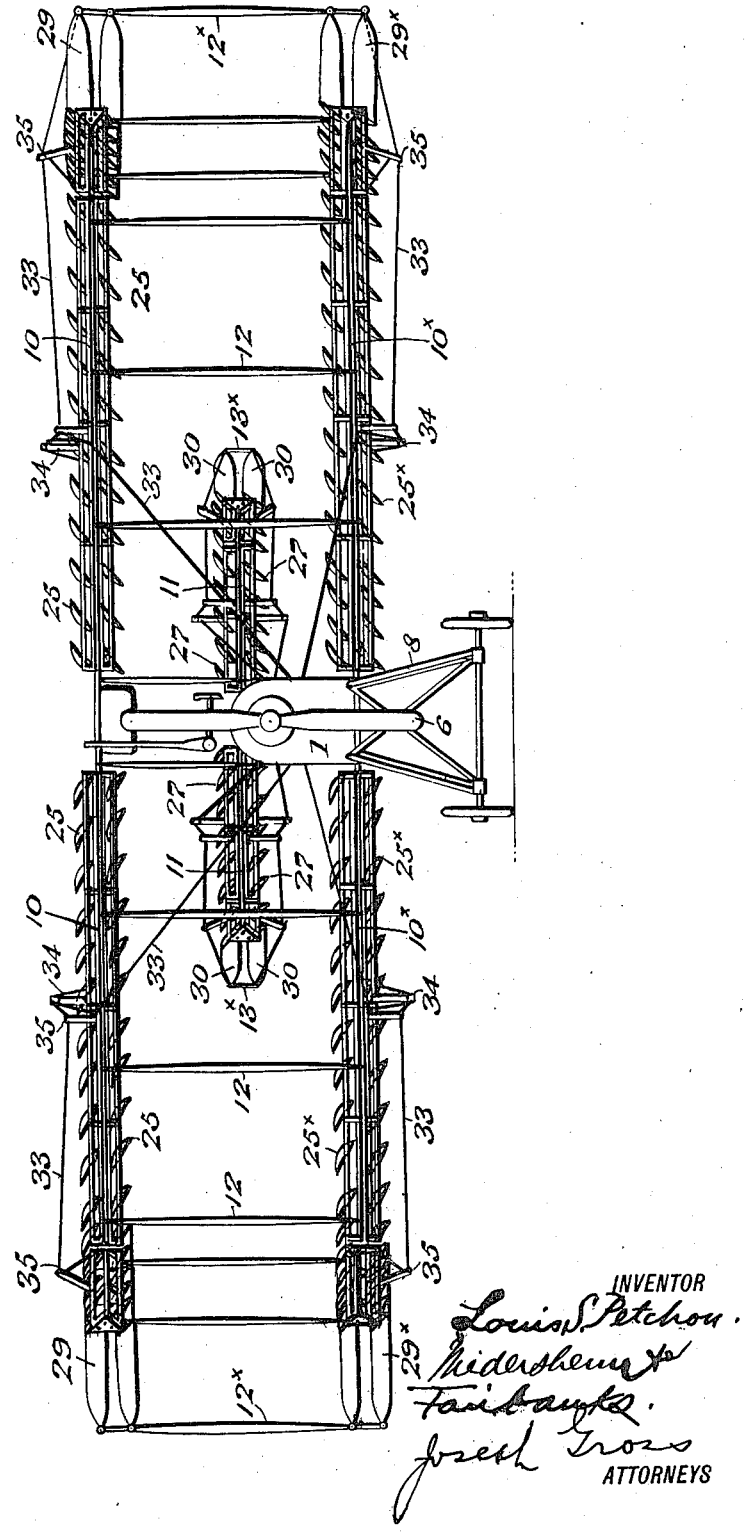
Fig. 2 represents a front elevation of the aeroplane of Fig. 1.
Figure 3:
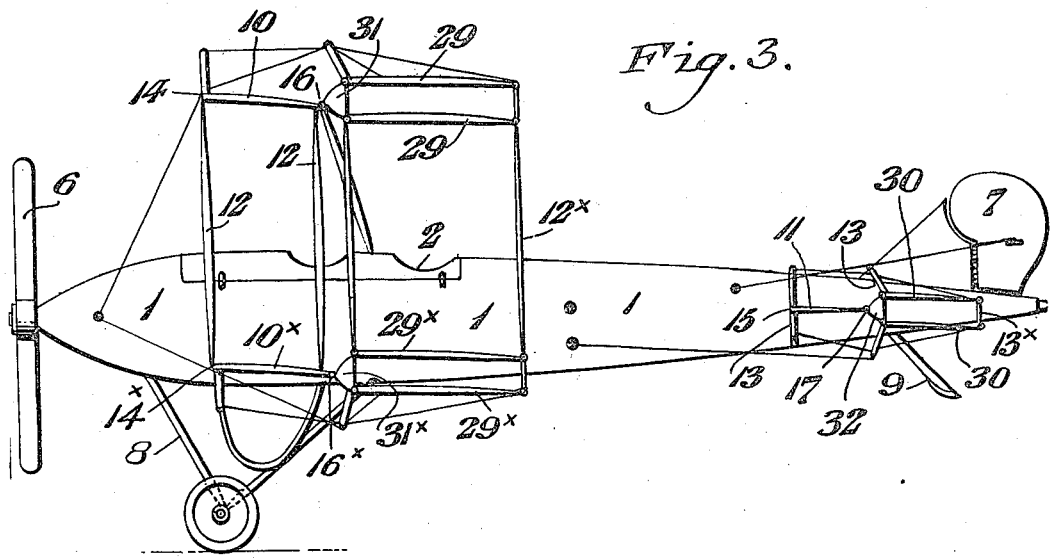
Fig. 3 represents a side elevation of the aeroplane of Figs. 1 and 2.

1 designates the fuselage of the machine, of any ordinary and preferred type and mode of construction. 2 is the cock pit, 3 the pilot's seat, 4 the observer's seat, 5 an engine or motor, 6 a propeller, 7 a vertical rudder connected with the tail plane organization and directed by any preferred steering means, which for clearness is not shown; 8 an under carriage skid, and 9 a tail skid;—all of any usual and preferred construction and assembled in any usual and preferred way.

10 designates the upper main wings, or "surfaces" as usually understood and as applied to and connected with the fuselage in any usual or preferred manner,—$10^x$ similarly designates the lower main wings,—and 11 the tail wings.

As the right hand and left hand upper main wings and the right hand and left hand lower main wings, 10 and $10^x$, and also the right hand and left hand tail wings, 11, are respectively, counterparts of each other,—I will, for simplicity, confine my description to the upper right hand main wings and tail wing, and, in passing, will make mention of the fact that the upper and lower main wings are connected by the struts 12, while the tail wings have the single strut 13.

The leading edges of the main wings 10 and $10^x$ are respectively designated 14 and $14^x$,—the leading edges of the tail wings, 11, 15,—the trailing edges of the main wings 16 and $16^x$,—and the trailing edges of the tail wings 17.

The tips of both the main wings and the tail wings are, as will be observed from the drawings, angled inwardly, oppositely and rearwardly with respect to the longitudinal axis, of the planes they occupy, and which planes parallel an imaginary horizontal plane through the longitudinal axis of the fuselage,—and within these angular tips and extending a given distance into the main bodies of both the main wings and tail wings are introduced my horizontal rudders of which 18 and $18^x$ designate those applied to the main wings 10 and $10^x$ and 19 those applied to the tail wings 11.

All of these six horizontal rudders are respectively hinged to, or otherwise suitably and tiltably connected with, the respective leading edges of the wings to which they are respectively applied, conveniently, however, by hinges 20, see Fig. 5, which correspond to the other hinges of the rudders $18^x$ and 19, which hinges are not shown.

To operate the horizontal rudders, I use any desired operating cable-control 22 which extends by the proper leads from the rudders directly to the pilot, and is subject to attachment either to a control lever or equivalent operating device, under his direct operation and regulation.

Without elaborating the paths of traverse, or the king posts, pulleys, or other supporting and directive devices with reference to which these rudder controls 22 are directed in their course between their points of lifting attachment to the rears of the rudders and the appropriate operating device by which the pilot operates them,—it is sufficient to say that, in the flight of the machine, the functions of direction of movement which the horizontal rudders perform, are subject to the operating skill and technical knowledge of the, at the time, existant requirements of the direction of flight, of the pilot.

Referring now to the "feather apparatus", or double assemblages of pluralities of tiltable feathers, to which more than to anything else, the novel, useful and successful operation, in its various capacities, of my machine is due, 25 designates pluralities of main feather applied to the trailing edges of the upper main wings 10,—and 25× counterpart pluralities of main feathers applied to the trailing edges of the lower main wings 10×,—or, to state it more precisely, to the rocking-feather-apparatus-frames 26 and 26× which respectively carry said respective pluralities of feather assemblages 25 and 25×.

27 designates pluralities of main feathers applied to the trailing edges 17 of the tail wings 11,—or, to state it more precisely, to the rocking-feather-apparatus-frame 28 which carries said respective pluralities of feather assemblages 37.

29 designates pluralities of tip-feathers applied to the outer edges of the tips of the upper main wings 10,—and 29× counterpart pluralities of tip feathers applied to the outer edges of the tips of the lower main wings 10×,—or, to state it more precisely, to the rocking-feather-apparatus-frames 31 and 31× which respectively carry said respective pluralities of feather assemblages 29 and 29×.

30 are pluralities of tip feathers applied to the outer edges of the tips of the tail wings 11,—or, to state it more precisely, to the rocking-feather-apparatus-frames 32, which respectively carry said respective pluralities of feather assemblages 30.

Each and all of the foregoing described pluralities or assemblages of tiltable feathers, respectively applied to the trailing edges and to the tips of the upper main wings and of the lower main wings,—and to the trailing edges and to the tips of the tail wings, are, as shown, of general counterpart or similar form, but they are so placed that the feathers are spread apart from each other, and also by given pluralities disposed in divergent angular relationship to the wings and tips to which they are applied, as well, so to speak, as to each other,—and each feather of each group, or "feather assemblage" as I have called it, is disposed angularly with respect to a normally considered and imagined horizontal plane of the wings, and in angular planar parallelism with every other feature of each group or plurality.

Otherwise to state it, each feather of each group, assemblage, plurality or "feather apparatus", so called, is disposed in planar parallelism with all of the other feathers, so that the feathers of each group while separated from each other, as shown, present as to their flat under surfaces air spaces through which the air in encountering them enters and passes.

Inasmuch as by reason of the shape of the feathers,—which, as stated, is flat on their under surfaces as the drawings indicate, and elliptical upon their upper surfaces to an outwardly extending terminal apex opposed to a flat base which bears against their carrying frames,—each group or assemblage according to the position which it is caused to assume under the control of the pilot, whether level, or upwardly or downwardly deflected or tilted, serves as a medium in the nature of the wing tips of birds, for the passage of the air through it, with the result,—which is due solely to their positioning under the control of the pilot,—that effect upon the machine is to cause its controlled movement in the direction desired when the propeller is in operation, or its virtually standing still or gliding when the engine is not in operation and the propeller is at rest.

Without separately differentiating them, which is not necessary to a clear understanding, 33 designates the operating cable-controls of all the pluralities or assemblages of feathers 25, 25×, 27, 29, 29× and 30,—and said controls extend to the pilot and are subject to attachment either to a controlled lever, wheel, or equivalent operating device, under his direct regulation and control.

Without elaborating the paths of traverse of these cables, or the king posts 34, pulleys, eyes, or other supporting and directing devices 35, with reference to which these controls are directed in their course between their points of lifting or tilting attachment to the feather assemblages, or, as may be preferable, to the feather-connecting wires 36, which connect the apices of the feathers of the respective groups, and the operating device by which the pilot at will operates the selected group or groups,—it is sufficient to explain that in the flight of the machine, the function of direction of movement which these assemblages of feathers perform are subject to the operating skill and technical knowledge of the, at the time, existant requirement of direction of flight of the pilot, and are essentially kindred to the function performed by the feathers of the wings of birds.

Figure 4:
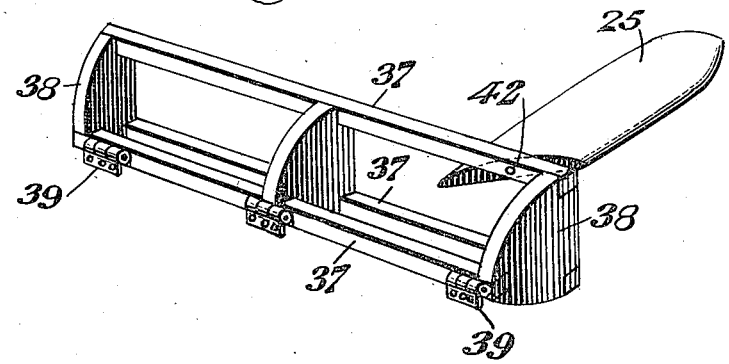
Fig. 4 represents a detached perspective of what I have termed a rocking-feather-apparatus-frame, which typifies merely a feather-carrying frame capable of being tilted, rocked or oscillated, and which is provided with a desired plurality of my feathers, of which one only, is however, illustrated as applied to said frame.

Although I have referred to the feather-carrying connections or frames, under the general expression of rocking-feather-apparatus-frames, and have illustrated particularly in Fig. 4 of the drawings, frames adapted for the purpose, in which a frame is shown as composed of three stringer pieces or spars 37 and of connecting triangular head-plates 38, hinged by hinges 39 to the trailing edges or to the tips of the several wings,—I do not, of course, confine myself to such a special construction of feather-carrying-frames,—because all that I wish to accomplish by means of frames of any kind is a support with relation to either a trailing edge or a tip of a wing, of two parallelly-disposed but separated groups or assemblages of feathers, linked together by links $12^x$ and $13^x$. relatively related as groups to the wings of the machine to which by groups they are applied, and adapted to be tilted, that is raised or lowered, and to be maintained relatively to the wings at desired angles or planes, for the purposes already explained.

While, also, I prefer to make my feathers of the general shape shown in the several figures of the drawings, and more particularly illustrated in Fig. 7 in which a light central main spar 40, carries and is carried by ribs 41, and in which both the level under surface and the elliptically curved and generally conical upper surface are canvas-covered and coated, so as to insure lightness,—and in which, moreover, a tenon 42 serves as a means for the insertion and fastening of each feather at the desired angle into the upper and lower stringer pieces of the frame respectively;—I do not confine myself to such construction or, in fact, to any detail of construction of the feathers *per se*, and I, also, contemplate proportioning and making them of such dimensions and in such desired pluralities, as experience indicates is best for the particular type of wings to which they as a group are applied.

Having now described a typical embodiment of my invention as applied to a biplane, it will be easily understood that in order to apply it to a monoplane, I simply make use of my dual system of assemblage of feather apparatus with both the main wing and the tail wings,—and, similarly, in applying it to a multiplane, make use of my dual system or assemblage of "feather apparatus" with all of the wings.

In connection with my dual "feather apparatus" in its application to other planes than biplanes, I make use of my horizontal rudders in connection with all of the wings, and in every application the control of the feather systems and rudders is subject to the experience and skill of the pilot, who, by practice under different conditions and directions of wind velocities and currents, necessarily learns to control the lift, thrust, drift and glide of the machine, by the operation of the "feather systems" and rudders, as experience may teach, and as it is impossible without prolixity in a patent specification to describe.

Suffice it is to say, that, by the expert control of my "feather systems", the propellant force of the air in passing through and between the wing surfaces and the several groups of pluralities of feathers, occasions a movement of the machine which because of the dual or duplicate system or arrangement of the feathers is more powerful and effective than in the parallel instance of the bird wings to which I have referred, because it is twice as great.

It will now be apparent that though I have devised a new and useful areoplane which embodies the features of advantage enumerated as desirable, and that while I have shown and described a preferred embodiment of it as applied to a biplane, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. A flying machine of the class described, which comprises in combination:—a fuselage or body,—a motor,—wings,—double assemblages of pluralities of feathers mounted in frames tiltably connected with the trailing edges of the wings,—and means for tilting said frames.

2. A flying machine of the class described, which comprises in combination:—a fuselage or body,—a motor,—main wings,—tail wings,—double assemblages of pluralities of feathers mounted in frames tiltably connected with the trailing edges of the wings,—and means for tilting said frames.

3. A flying machine of the class described, which comprises in combination:—a fuselage or body,—a motor,—a pair of upper main wings,—a pair of lower main wings,—a pair of tail wings,—a double assemblage of pluralities of feathers mounted in frames tiltably connected with the trailing edges of both pairs of main wings,—a counter-part assemblage of pluralities of feathers mounted in frames tiltably connected with the trailing edges of the tail wings,—and means for tilting said double assemblages of frames.

4. An aeroplane, which comprises in combination:—a fuselage or body,—a motor,—main wings,—tail wings,—a vertical rudder,—horizontal rudders at the tips of the main wings,—horizontal rudders at the tips of the tail wings,—a double assemblage of pluralities of feathers tiltably connected with the trailing edges of the wings,—means for tilting said horizontal rudders,—and means for directing said vertical rudder.

5. An aeroplane of the class described, which comprises in combination:—a fuselage or body,—a motor,—a pair of upper main wings,—a pair of lower main wings,—a pair of tail wings,—a double assemblage the functions of direction of movement which the horizontal rudders perform, are subject to the operating skill and technical knowledge of the, at the time, existant requirements of the direction of flight, of the pilot.

Referring now to the "feather apparatus", or double assemblages of pluralities of tiltable feathers, to which more than to anything else, the novel, useful and successful operation, in its various capacities, of my machine is due, 25 designates pluralities of main feather applied to the trailing edges of the upper main wings 10,—and 25× counterpart pluralities of main feathers applied to the trailing edges of the lower main wings 10×,—or, to state it more precisely, to the rocking-feather-apparatus-frames 26 and 26× which respectively carry said respective pluralities of feather assemblages 25 and 25×.

27 designates pluralities of main feathers applied to the trailing edges 17 of the tail wings 11,—or, to state it more precisely, to the rocking-feather-apparatus-frame 28 which carries said respective pluralities of feather assemblages 37.

29 designates pluralities of tip-feathers applied to the outer edges of the tips of the upper main wings 10,—and 29× counterpart pluralities of tip feathers applied to the outer edges of the tips of the lower main wings 10×,—or, to state it more precisely, to the rocking-feather-apparatus-frames 31 and 31× which respectively carry said respective pluralities of feather assemblages 29 and 29×.

30 are pluralities of tip feathers applied to the outer edges of the tips of the tail wings 11,—or, to state it more precisely, to the rocking-feather-apparatus-frames 32, which respectively carry said respective pluralities of feather assemblages 30.

Each and all of the foregoing described pluralities or assemblages of tiltable feathers, respectively applied to the trailing edges and to the tips of the upper main wings and of the lower main wings,—and to the trailing edges and to the tips of the tail wings, are, as shown, of general counterpart or similar form, but they are so placed that the feathers are spread apart from each other, and also by given pluralities disposed in divergent angular relationship to the wings and tips to which they are applied, as well, so to speak, as to each other,—and each feather of each group, or "feather assemblage" as I have called it, is disposed angularly with respect to a normally considered and imagined horizontal plane of the wings, and in angular planar parallelism with every other feature of each group or plurality.

Otherwise to state it, each feather of each group, assemblage, plurality or "feather apparatus", so called, is disposed in planar parallelism with all of the other feathers, so that the feathers of each group while separated from each other, as shown, present as to their flat under surfaces air spaces through which the air in encountering them enters and passes.

Inasmuch as by reason of the shape of the feathers,—which, as stated, is flat on their under surfaces as the drawings indicate, and elliptical upon their upper surfaces to an outwardly extending terminal apex opposed to a flat base which bears against their carrying frames,—each group or assemblage according to the position which it is caused to assume under the control of the pilot, whether level, or upwardly or downwardly deflected or tilted, serves as a medium in the nature of the wing tips of birds, for the passage of the air through it, with the result,—which is due solely to their positioning under the control of the pilot,—that effect upon the machine is to cause its controlled movement in the direction desired when the propeller is in operation, or its virtually standing still or gliding when the engine is not in operation and the propeller is at rest.

Without separately differentiating them, which is not necessary to a clear understanding, 33 designates the operating cable-controls of all the pluralities or assemblages of feathers 25, 25×, 27, 29, 29× and 30,—and said controls extend to the pilot and are subject to attachment either to a controlled lever, wheel, or equivalent operating device, under his direct regulation and control.

Without elaborating the paths of traverse of these cables, or the king posts 34, pulleys, eyes, or other supporting and directing devices 35, with reference to which these controls are directed in their course between their points of lifting or tilting attachment to the feather assemblages, or, as may be preferable, to the feather-connecting wires 36, which connect the apices of the feathers of the respective groups, and the operating device by which the pilot at will operates the selected group or groups,—it is sufficient to explain that in the flight of the machine, the function of direction of movement which these assemblages of feathers perform are subject to the operating skill and technical knowledge of the, at the time, existant requirement of direction of flight of the pilot, and are essentially kindred to the function performed by the feathers of the wings of birds.

Although I have referred to the feather-carrying connections or frames, under the general expression of rocking-feather-apparatus-frames, and have illustrated particularly in Fig. 4 of the drawings, frames adapted for the purpose, in which a frame is shown as composed of three stringer pieces or spars 37 and of connecting triangular head-plates 38, hinged by hinges 39 to the trailing edges or to the tips of the several wings,—I do not, of course, confine myself to such a special construction of feather-carrying-frames,—because all that I wish to accomplish by means of frames of any kind is a support with relation to either a trailing edge or a tip of a wing, of two parallelly-disposed but separated groups or assemblages of feathers, linked together by links 12ˣ and 13ˣ, relatively related as groups to the wings of the machine to which by groups they are applied, and adapted to be tilted, that is raised or lowered, and to be maintained relatively to the wings at desired angles or planes, for the purposes already explained.

While, also, I prefer to make my feathers of the general shape shown in the several figures of the drawings, and more particularly illustrated in Fig. 7 in which a light central main spar 40, carries and is carried by ribs 41, and in which both the level under surface and the elliptically curved and generally conical upper surface are canvas-covered and coated, so as to insure lightness,—and in which, moreover, a tenon 42 serves as a means for the insertion and fastening of each feather at the desired angle into the upper and lower stringer pieces of the frame respectively;—I do not confine myself to such construction or, in fact, to any detail of construction of the feathers *per se*, and I, also, contemplate proportioning and making them of such dimensions and in such desired pluralities, as experience indicates is best for the particular type of wings to which they as a group are applied.

Having now described a typical embodiment of my invention as applied to a biplane, it will be easily understood that in order to apply it to a monoplane, I simply make use of my dual system of assemblage of feather apparatus with both the main wing and the tail wings,—and, similarly, in applying it to a multiplane, make use of my dual system or assemblage of "feather apparatus" with all of the wings.

In connection with my dual "feather apparatus" in its application to other planes than biplanes, I make use of my horizontal rudders in connection with all of the wings, and in every application the control of the feather systems and rudders is subject to the experience and skill of the pilot, who, by practice under different conditions and directions of wind velocities and currents, necessarily learns to control the lift, thrust, drift and glide of the machine, by the operation of the "feather systems" and rudders, as experience may teach, and as it is impossible without prolixity in a patent specification to describe.

Suffice it is to say, that, by the expert control of my "feather systems", the propellant force of the air in passing through and between the wing surfaces and the several groups of pluralities of feathers, occasions a movement of the machine which because of the dual or duplicate system or arrangement of the feathers is more powerful and effective than in the parallel instance of the bird wings to which I have referred, because it is twice as great.

It will now be apparent that though I have devised a new and useful areoplane which embodies the features of advantage enumerated as desirable, and that while I have shown and described a preferred embodiment of it as applied to a biplane, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. A flying machine of the class described, which comprises in combination:—a fuselage or body,—a motor,—wings,—double assemblages of pluralities of feathers mounted in frames tiltably connected with the trailing edges of the wings,—and means for tilting said frames.

2. A flying machine of the class described, which comprises in combination:—a fuselage or body,—a motor,—main wings,—tail wings,—double assemblages of pluralities of feathers mounted in frames tiltably connected with the trailing edges of the wings,—and means for tilting said frames.

3. A flying machine of the class described, which comprises in combination:—a fuselage or body,—a motor,—a pair of upper main wings,—a pair of lower main wings,—a pair of tail wings,—a double assemblage of pluralities of feathers mounted in frames tiltably connected with the trailing edges of both pairs of main wings,—a counter-part assemblage of pluralities of feathers mounted in frames tiltably connected with the trailing edges of the tail wings,—and means for tilting said double assemblages of frames.

4. An aeroplane, which comprises in combination:—a fuselage or body,—a motor,—main wings,—tail wings,—a vertical rudder,—horizontal rudders at the tips of the main wings,—horizontal rudders at the tips of the tail wings,—a double assemblage of pluralities of feathers tiltably connected with the trailing edges of the wings,—means for tilting said horizontal rudders,—and means for directing said vertical rudder.

5. An aeroplane of the class described, which comprises in combination:—a fuselage or body,—a motor,—a pair of upper main wings,—a pair of lower main wings,—a pair of tail wings,—a double assemblage of pluralities of feathers tiltably connected with the trailing edges of each pair of upper main wings and with each pair of lower main wings,—a double assemblage of pluralities of feathers tiltably connected with the trailing edges of the tail wings,—and means for tilting all of said assemblages of pluralities of feathers.

6. An aeroplane of the class described, comprising in combination:—a fuselage of body,—a motor,—a pair of upper main wings,—a pair of lower main wings,—a pair of tail wings,—a double assemblage of pluralities of feathers tiltably connected with the trailing edges of each pair of upper main wings and with each pair of lower main wings,—a double assemblage of pluralities of feathers tiltably connected with the trailing edges of the tail wings,—a double assemblage of pluralities of feathers tiltably connected with the tips of both pairs of main wings,—a double assemblage of pluralities of feathers tiltably connected with each tip of the tail wings,—and means for tilting all of said assemblages of pluralities of feathers.

7. An aeroplane of the class described, which comprises in combination:—a fuselage or body,—a motor,—a pair of upper main wings,—a pair of lower main wings,—a pair of tail wings,—double assemblages of pluralities of feathers tiltably connected with the trailing edges of the main wings,—double assemblages of pluralities of feathers tiltably connected with the tips of both pairs of main wings,—double assemblages of pluralities of feathers tiltably connected with the tips of the tail wings,—and means for tilting all of said assemblages of pluralities of feathers.

8. An aeroplane of the class described, which comprises in combination:—a fuselage or body,—a motor,—a pair of upper main wings,—a pair of lower main wings,—a pair of tail wings,—horizontal rudders at the tips of both pairs of main wings,—horizontal rudders at the tips of the tail wings,—a double assemblage of pluralities of feathers tiltably connected with the trailing edges of the main wings,—a double assemblage of pluralities of feathers tiltably connected with the trailing edges of the tail wings,—a double assemblage of pluralities of feathers tiltably connected with the tips of both pairs of main wings,—a double assemblage of pluralities of feathers tiltably connected with the tips of the tail wings,—means for tilting all of said assemblages of pluralities of feathers,—and means for tilting said horizontal rudders.

9. An aeroplane of the class described, which comprises in combination:—a fuselage or body,—a motor,—a pair of upper main wings,—a pair of lower main wings,—a pair of tail wings,—a vertical rudder,— horizontal rudders at the tips of both pairs of main wings,—horizontal rudders at the tips of the tail wings,—a double assemblage of pluralities of feathers tiltably connected with the trailing edges of each of the pair of upper main wings,—a double assemblage of pluralities of feathers tiltably connected with the trailing edges of each of the pair of lower main wings,—a double assemblage of pluralities of feathers tiltably connected with the trailing edges of the tail wings,—a double assemblage of pluralities of feathers tiltably connected with the tips of each wing of both pairs of upper and lower main wings,—a double assemblage of pluralities of feathers tiltably connected with the tips of the tail wings,—means for tilting all of said assemblages of pluralities of feathers,— means for tilting said horizontal rudders,— and means for directing said vertical rudder.

10. A flying machine of the class described, which comprises in combination:— a fuselage or body,—a motor,—main wings,— tail wings,—double assemblages of pluralities of feathers flat upon their under sides, extending rearwardly, separated from each other and tiltably connected by carrying frames with the trailing edges of the wings,— feather carrying frames,—and means for tilting said feathers and frames.

11. A flying machine of the class described, which comprises in combination:— a fuselage or body,—a motor,—a pair of upper main wings,—a pair of lower main wings,—a pair of tail wings,—double assemblages of pluralities of feathers flat upon their under sides, extending rearwardly, separated from each other and tiltably connected by carrying frames with the trailing edges of all of the wings,—feather-carrying frames,—and means for tilting said feathers and frames.

12. A flying machine of the class described, which comprises in combination:— a fuselage or body,—a motor,—main wings,—tail wings,—a vertical rudder,— horizontal rudders at the tips of the tail wings,—double assemblages of pluralities of feathers, corresponding in shape, flat upon their under sides, extending rearwardly, correspondingly angular with respect to each other, separated from each other and tiltably connected with the trailing edges of both the main wings and the tail wings,—means for tilting said assemblages of pluralities of feathers,—means for tilting said horizontal rudders,—and means for directing said vertical rudders.

13. An aeroplane of the class described,— which comprises in combination:—a fuselage or body,—a motor,—a pair of upper main wings,—a pair of lower main wings,—a pair of tail wings,—horizontal rudders at the tips of both pairs of main wings,—horizontal rudders at the tips of the tail wings,— a double assemblage of pluralities of feathers, corresponding in shape, flat upon their undersides, separated from and angularly disposed with respect to each other, and tiltably connected with the trailing edges of each pair of main wings,—a double assemblage of pluralities of feathers, corresponding in shape, flat upon their under sides, separated from and angularly disposed with respect to each other, and tiltably connected with the trailing edges of the tail wings,— a double assemblage of pluralities of feathers in shape, flat upon their undersides, separated from and angularly disposed with respect to each other, and tiltably connected with the tip of each pair of main wings,—a double assemblage of pluralities of feathers, corresponding in shape, flat upon their undersides, separated from and angularly disposed with respect to each other, and tiltably connected with the tip of each tail wing,—means for tilting all of said assemblages of pluralities of feathers, and means for tilting said several horizontal rudders.

14. An aeroplane of the class described, which comprises in combination:—a fuselage or body,—a motor,—a pair of upper main wings,—a pair of lower main wings,—a pair of tail wings,—a double assemblage of pluralities of feathers, correspondent in shape, flat upon their undersides, separated from and angularly disposed with respect to each other, and tiltably connected with the trailing edges of the main wings,—a double assemblage of pluralities of feathers, corresponding in shape, flat upon their undersides, separated from and angularly disposed with respect to each other, and tiltably connected with the trailing edges of the tail wings,—a double assemblage of pluralities of feathers, corresponding in shape, flat upon their under sides, separated from and angularly disposed with respect to each other, and tiltably connected with each tip of each pair of main wings,—a double assemblage of pluralities of feathers, corresponding in shape, flat upon their under sides, separated from and angularly disposed with respect to each other, and tiltably connected with the tip of each tail wing,—and means for tilting all of said assemblages of pluralities of feathers.

In testimony whereof I have hereunto signed my name.

LOUIS S. PETCHON.

In the presence of:
J. BONSALL TAYLOR,
C. D. McVAY.